United States Patent [19]

Edelböck

[11] 4,091,369

[45] May 23, 1978

[54] COLLISION-RESPONSIVE ALARM WITH A ROTATING REFLECTOR AND WARNING LIGHT

[76] Inventor: Wilhelm K. Edelböck, Margraf Wilhelm Str. 40, Bad Rotenfels, D 7560 Gaggenau, Germany

[21] Appl. No.: 744,419

[22] Filed: Nov. 23, 1976

[30] Foreign Application Priority Data

Dec. 12, 1975 Austria .................................. 9451/75

[51] Int. Cl.² ........................ B60Q 1/52; G08B 21/00
[52] U.S. Cl. ............................ 340/262; 200/61.45 R; 362/35; 362/294; 350/6.5; 340/52 H; 340/87
[58] Field of Search ................. 340/52 H, 262, 87, 97, 340/366 E; 240/8.18, 49; 200/61.45 R; 350/7

[56] References Cited

U.S. PATENT DOCUMENTS

| | | | |
|---|---|---|---|
| 2,056,494 | 10/1936 | Tucker, Jr. et al. | 200/61.45 R |
| 2,814,029 | 11/1957 | McRea | 340/87 |
| 3,286,055 | 11/1966 | Jewell | 200/61.45 R |

*Primary Examiner*—Glen R. Swann, III
*Attorney, Agent, or Firm*—Cushman, Darby & Cushman

[57] ABSTRACT

A housing contains a rotating reflector and incandescent lamp in a transparent upper part. An impact-responsive switch in a base of the housing turns on the lamp and a motor to rotate the reflector. Fan blades on the reflector pull cooling air through inlet slits on the bottom part of the housing, past the lamp, and out one or more openings in the transparent part of the housing.

5 Claims, 1 Drawing Figure

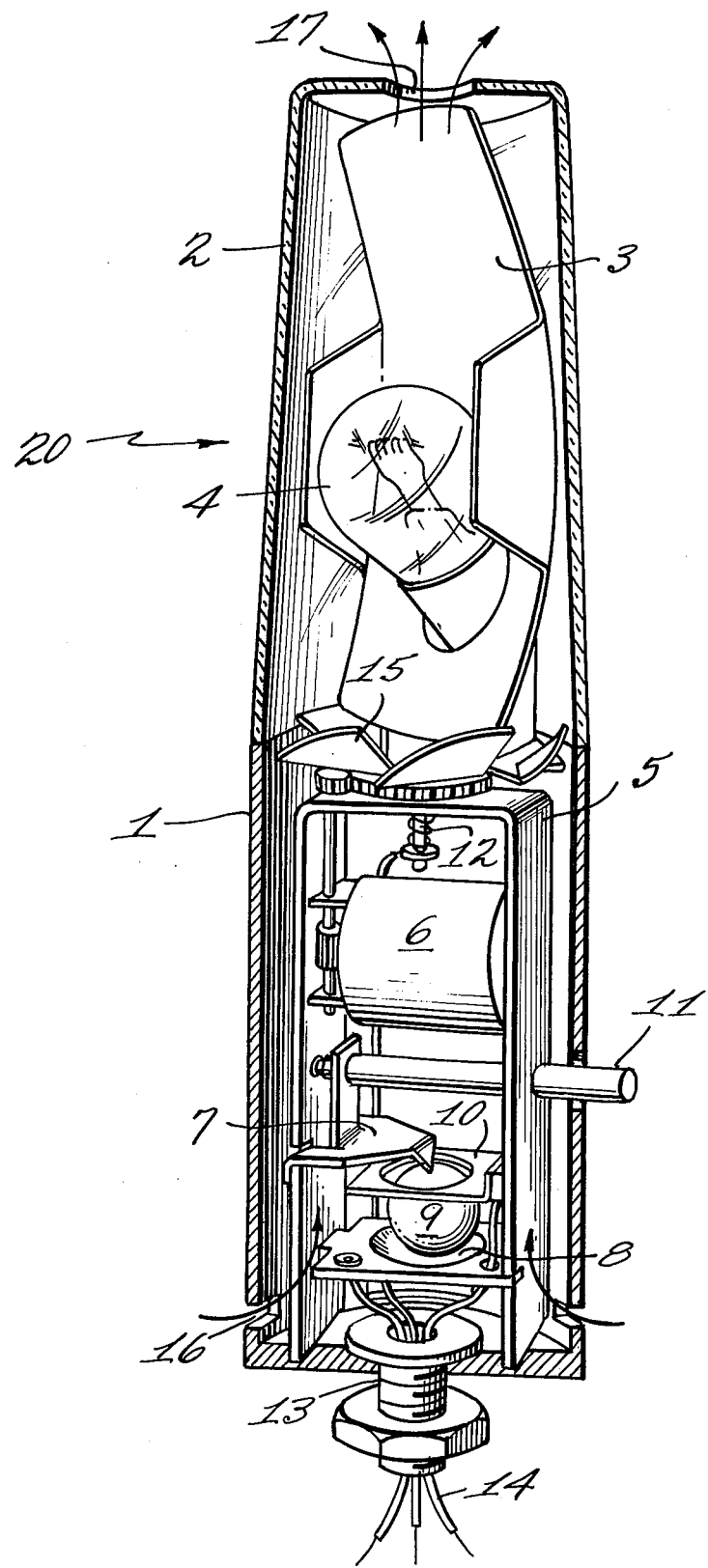

COLLISION-RESPONSIVE ALARM WITH A ROTATING REFLECTOR AND WARNING LIGHT

BACKGROUND OF THE INVENTION

The invention is directed to an automobile blinking warning light which upon suddenly occuring danger from or because of an accident can be switched on automatically from the driver's seat and whose new type of construction, including a cooling system, makes possible so small a structure that it can be mounted in the inside of the vehicle without obstructing the view and thus to make known with its rapid, revolving beam of rays towards all sides and to a far extent that the stationary or disabled vehicle is a dangerous obstacle on the roadway.

Numerous blinking warning lights are known or are in the auto accessory market. Most are mounted with dry batteries, frequently remain for years at a time in the trunk and if they are used, the lamps which are already weak of themselves are for the most part entirely unusable. Besides, their light is very scattered because an exactly perpendicular arrangement, e.g. on the rounded auto dashboard, cannot be provided in emergency situations.

Also the legally specified blinking warning hookups of the blinking lights already present on the vehicle for the director indicators cannot prevent the continuously increasing and repeated mass collisions, especially in heavy columns of traffic and with poor view, because all warning apparatus which must be erected or switched on with an accident are valueless if the driver has lost his head (medically: shock from an accident), is injured or is killed.

SUMMARY OF THE INVENTION

The rotating reflector-warning light of the invention is self-switching on in case of an accident. It is mounted in the rear part of the vehicle at window height, e.g. on the storage space lid, with only a screw and is bound to the vehicle battery or to a corresponding terminal in the fuse box in part directly, in part via a switch on the dashboard. The state of charge and the capacity of the vehicle battery guarantee a secure and high performance of the warning light. The strong radiation beam of the revolving reflector illuminates around the place of the accident and beams through the windshields and rear windows of the following vehicles. On the contrary, the substantially lower arranged blinking lights of blinking warning systems of following vehicles are concealed and upon starting up, as is known, as first destroyed. Frequently with the destruction of the blinking lights a portion of the wiring system fails.

An essential characteristic of the invention is the structural and functional combination, in part known and in part novel construction elements, such as an impact-responsive switch, revolving reflector, driving and cooling system. Accordingly the patent application is not limited to the construction of a specific impact-responsive switch, a specific revolving reflector or to a specific forced air cooling of the incandescent lamp.

BRIEF DESCRIPTION OF THE DRAWING

The single FIGURE of the drawing is a sectional view of one form of automatic revolving reflector-warning light according to the invention

DESCRIPTION OF THE PREFERRED EMBODIMENT

As in any housing (designated generically at 20) of a warning light provided with a turning, e.g. revolving reflector, there is located in the lower part the motor 6 with its drive unit and in the upper part 2, which is transparent, there are located the revolving reflector 3 with the incandescent lamp 4.

In detail, there is seen in the lower portion 1 the frame 5 with the automatic switch, also called an impact-responsive switch. A conductive ball 9 comprises a circuit element (which is known per se — see German Pat. No. 1,926,584, German Gebrauchsmuster 196,889 and U.S. Pat. No. 2,794,084) and is concentrically retained in a conical recess 8 by a spring contact 7. If now the ball 9 is hurled from the middle position, as occurs in case of an accident, the contact clutch 7 wedges the ball laterally in the circular opening in the contact plate 10 and by its mass the ball closes the circuit for the motor 6 and incandescent lamp 4.

The motor via a worm gear and a pair of spur gears drives the revolving reflector 3 with the incandescent lamp 4 inserted in this support and with its base penetrating it. Fan blades 15 are turned with the revolving reflector 3, the incandescent lamp and with the common support around whose shaft 12 is lead the remaining plus pole for the incandescent lamp. The fan blades force cooling air past the hot incandescent lamp, which air can enter the bottom side of the housing through several slots 16. Through the opening 17 at the top of the upper transparent part of the housing warm air can again leave.

The rotating reflector-warning light as mentioned can be suitably mounted on the storage shelf before the rear window or on a bracket by means of a hollow screw 13 in the passenger space. The lines 14 are together bound to the plus pole of the battery and to a switch which the drive can reach in a sudden danger.

The manually operable resetting means 11 serves to switch off the warning light and installation on an accident by moving the spring contact 7 with respect to ball 9 so that the ball 9 is set free and the ball can roll back into the conical recess 8.

While the invention has been herein shown and described in what is presently conceived to be the most practical and preferred form of the invention, it will be apparent to those of ordinary skill in the art that many modifications may be made thereof within the scope of the invention, which scope is to be accorded the broadest interpretation of the appended claims so as to encompass all equivalent structures and devices. What is claimed is:

1. A condition-responsive warning light assembly comprising an incandescent lamp,
   a rotatable reflector for reflecting light from said lamp, means for rotating said reflector,
   impact-responsive switching means for initiating operation of said rotating means in response to a strong impact,
   housing means for containing said lamp, reflector, rotating means, and impact-responsive switching means, said housing having a translucent upper portion for allowing the passage of light from said lamp and reflector therethrough and said reflector rotatable with respect to said housing means, and
   means providing circulation of air through said housing to cool said lamp, said means comprising air inlet means, air outlet means and means for moving air from said inlet means through said outlet means past said lamp.

2. An assembly as recited in claim 1 wherein said impact-responsive switching means comprises a conductive ball, a conically shaped depression in a base plate for receipt of said ball, a spring contact for normally retaining said ball in said depression, and a contact plate, said ball completing a circuit between said contact plate and said spring contact when said assembly is subjected to impact.

3. An assembly as recited in claim 2 further comprising manually operable reset means for moving said spring contact with respect to said ball to reset said switching means after termination of an impact condition.

4. An assembly as recited in claim 1 further comprising means for mounting said incandescent lamp for rotation with said reflector so that the axis of projection of said reflector makes an acute angle with the longitudinal axis of said lamp.

5. An assembly as recited in claim 1 wherein said means for moving air from said air inlet means through said air outlet means comprises at least one fan blade mounted for rotation with said rotatable reflector, and wherein said air inlet means is disposed at a bottom portion of said housing, and said air outlet means is disposed at a top portion of said housing.

* * * * *